June 3, 1952     A. W. PHILLIPS     2,599,280
LAWN SPRINKLER
Filed Feb. 16, 1950     2 SHEETS—SHEET 2
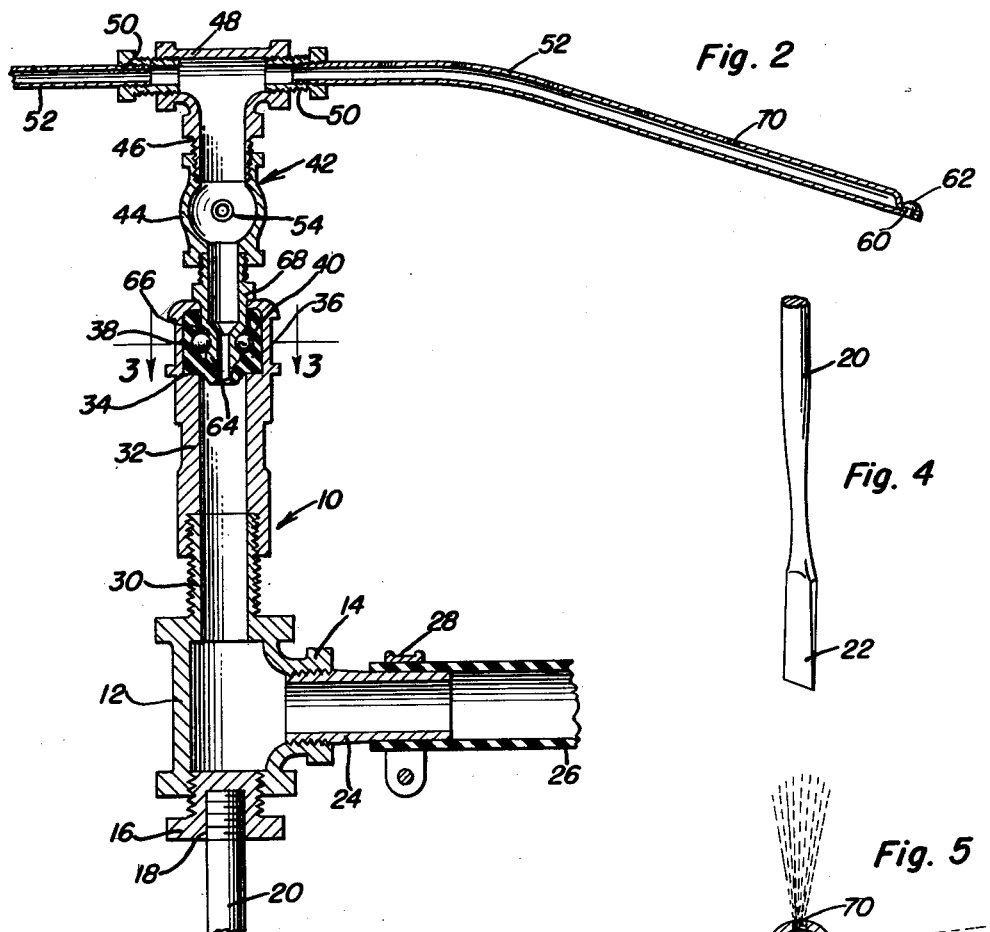
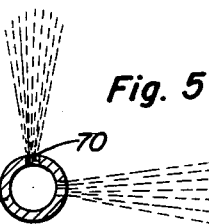
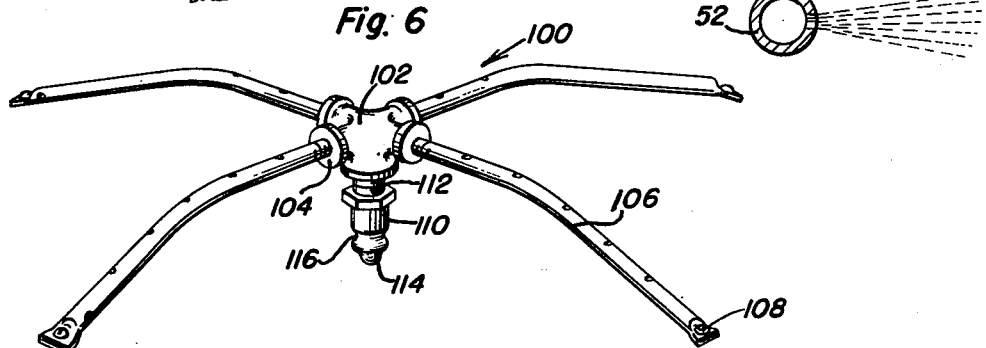
Asa W. Phillips
INVENTOR.

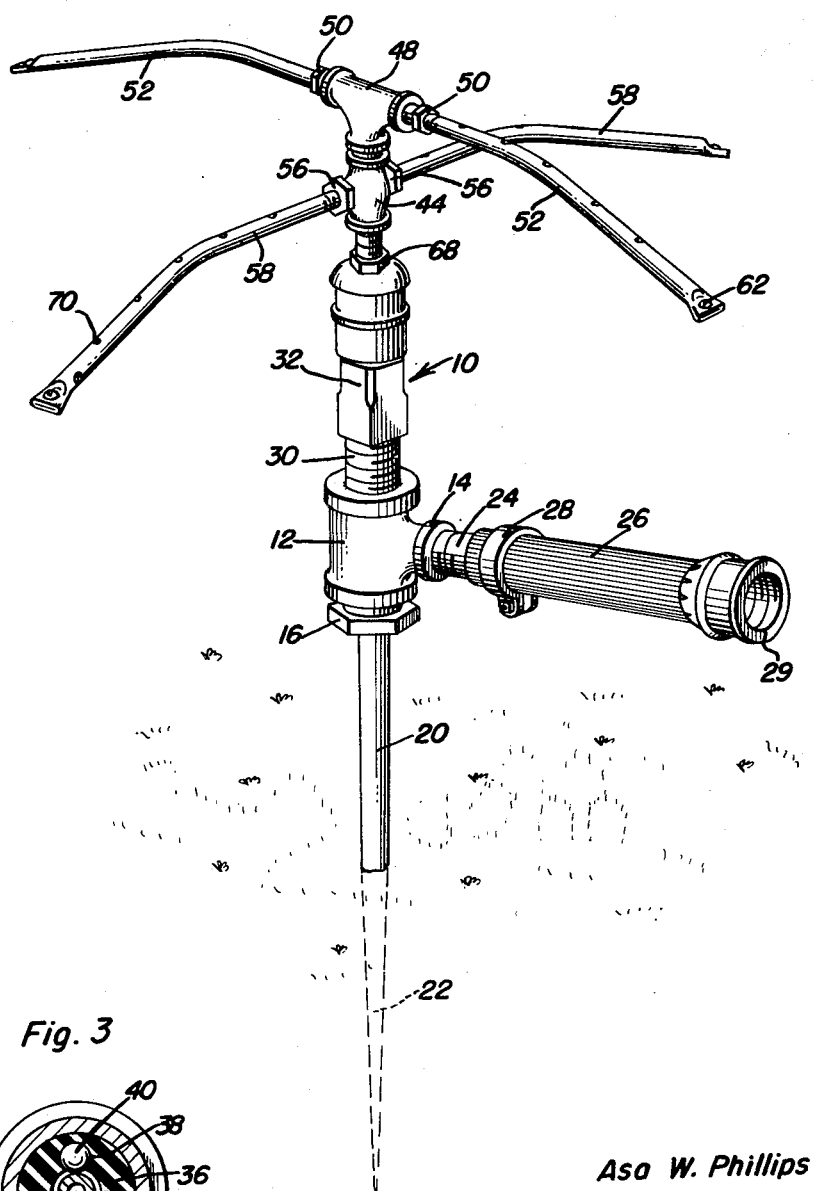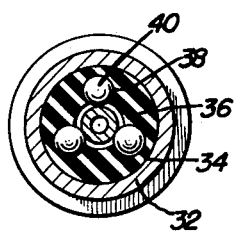

Patented June 3, 1952

2,599,280

UNITED STATES PATENT OFFICE 2,599,280

LAWN SPRINKLER

Asa W. Phillips, Melvindale, Mich.

Application February 16, 1950, Serial No. 144,477

2 Claims. (Cl. 285—97.3)

This invention relates to new and useful improvements in lawn sprinklers and the primary object of the present invention is to provide a lawn sprinkler including a support, a spray head rotatable on the support and a novel and improved means for attaching the head to the support so that the head may be quickly and readily applied to or removed from the support in a convenient manner for inspection, repair or replacement of parts.

Another important object of the present invention is the provision of a support having a resilient bearing sleeve that holds a group of ball bearings for entering a groove in a rotatable spray head to retain the spray head in position to the support.

A further object of the present invention is to provide a lawn spray including a ground rod that is embedded in the ground at any desired location for supporting the sprinkler in an elevated position.

A still further aim of the present invention is to provide a lawn sprinkler that is extremely small and compact in structure, simple and practical in construction, strong and reliable in use, inexpensive to manufacture and service, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention in position for use;

Figure 2 is a fragmentary vertical sectional view taken substantially through the center of Figure 1;

Figure 3 is an enlarged detail sectional view taken substantially on the plane of section line 3—3 of Figure 2;

Figure 4 is a fragmentary perspective view of the ground rod or post;

Figure 5 is an enlarged transverse sectional view of one of the spray arms; and

Figure 6 is a perspective view of the spray head in slightly modified form.

Referring now to the drawings in details, wherein for the purpose of illustration, there is disclosed a preferred embodiment of the present invention, the numeral 10 represents a tubular support including a T-fitting having a vertical portion 12 and a horizontal portion 14. A plug 16 is threaded in the lower end of the vertical portion and is formed with a threaded recess 18 that receivably engages the upper threaded end of a ground rod or post 20. The lower end of the rod 20 is flattened to provide a point 22 for penetrating the ground.

The internally threaded horizontal portion 14 of the T-fitting receivably engages an inlet nipple 24 about which there is clamped a hose section 26 through the medium of a suitable clamp 28. The section 26 supports the usual hose coupling sleeve 29 so that a garden hose can be attached to the section 26 for admitting water into the support.

An externally threaded sleeve 30 rises from the vertical portion 12 and receivably engages the internally threaded lower end of the upper tubular section 32 for the support 10.

The upper end of the tubular section 32 is provided with an internal groove or seat 34 in which there is mounted a resilient, preferably rubber, bearing sleeve 36. The inner surface or periphery of the sleeve 36 is downwardly tapered and is also formed with a plurality of circumferentially spaced concave depressions or seats 38 in which there is received spherical elements or balls 40.

The numeral 42 represents the spray head comprising an open ended hollow member 44 having an upper internally threaded end that receivably engages the externally threaded portion 46 of an upper fitting. The horizontal portion 48 is provided with internally threaded ends that receive holding sleeves 50. The inner ends of an upper pair of tubular spray arms 52 are threaded in the holding sleeves 50.

The member 44 is provided with a pair of diametrically opposed threaded openings 54 that receive a lower pair of holding sleeves 56. The inner ends of a pair of lower tubular spray arms 58 are threaded in the sleeves 56.

The outer ends of the arms 52 and 58 are provided with opposed internally threaded openings 60 that receivably engage fasteners 62 for flattening and sealing the outer ends of the arms.

In practical use of the present invention, the lower tapered end portion 64 of the member 44 is forced into the sleeve 36 until the balls 40 enter a peripheral groove 66 in the end portion 64 to yieldingly retain the spray head relative to the support 10 for rotation. The end portion 64 is also provided with a flange 68 that rides upon the upper end of the support 10 during rotation of the spray head 42 relative to the support.

The arms 52 and 58 are formed with the usually spaced and arranged delivery ports 70 so that as water passes from the arms the spray head will rotate.

Figure 6 shows the spray head in slightly modified form. In this embodiment, the spray head 100 consists of a four-way pipe fitting 102 each arm or branch of which receivably engages a holding sleeve 104. The sleeves 104 are internally threaded to receive the inner ends of tubular spray arms 106 having their outer ends pressed tight and closed by fasteners 108 threaded in opposed apertures in the outer ends of the arms.

An attaching element 110 is secured to a threaded nipple 112 depending from the fitting 102 and includes a tapered lower end 114 for entering the sleeve 36 and a peripheral groove 116 for receiving the balls 40.

The spray head 100 functions like the spray head 42 and is applied to the support 10 in the same manner as the spray head 42.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a sprinkler including a tubular support including an upper end having an internal groove, a rubber sleeve yieldingly retained in said groove, a hollow spray-arm supporting member having an end portion extending into the sleeve, said end portion of said member having a peripheral groove, and a plurality of balls within the sleeve and seated in said groove to retain the end portion of said member in said sleeve.

2. In a sprinkler including a tubular support including an upper end having an internal groove, a rubber sleeve yieldingly retained in said groove, a hollow spray-arm supporting member having an end portion extending into the sleeve, said end portion of said member being inwardly tapered to enter the sleeve and having a peripheral groove, and a plurality of balls within said sleeve and seated in said groove to yieldingly retain the member engaged with the support.

ASA W. PHILLIPS.

REFERENCES CITED

The following references are of record in the file of this patent:

UNITED STATES PATENTS

| Number | Name | Date |
|---|---|---|
| 616,032 | Struhs | Dec. 13, 1898 |
| 1,180,526 | Partridge | Apr. 25, 1916 |
| 1,760,201 | Macomber | May 27, 1930 |
| 1,873,304 | Demooy | Aug. 13, 1932 |
| 2,310,744 | Osborn | Feb. 9, 1943 |
| 2,323,701 | Barksdale | July 6, 1943 |
| 2,335,332 | Wright | Nov. 30, 1943 |
| 2,410,930 | DeMott | Nov. 12, 1946 |
| 2,448,688 | Scheiwer | Sept. 7, 1948 |
| 2,511,386 | Warren | June 13, 1950 |